(12) United States Patent
Wang et al.

(10) Patent No.: US 9,619,512 B2
(45) Date of Patent: Apr. 11, 2017

(54) MEMORY SEARCHING SYSTEM AND METHOD, REAL-TIME SEARCHING SYSTEM AND METHOD, AND COMPUTER STORAGE MEDIUM

(71) Applicant: TENCENT TECHNOLOGY (SHENZHEN) COMPANY LIMITED, Shenzhen, Guangdong (CN)

(72) Inventors: Changwei Wang, Shenzhen (CN); Wei Wang, Shenzhen (CN); Hongwei Jiang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 111 days.

(21) Appl. No.: 14/403,047

(22) PCT Filed: Jun. 5, 2013

(86) PCT No.: PCT/CN2013/076788
§ 371 (c)(1),
(2) Date: Nov. 21, 2014

(87) PCT Pub. No.: WO2013/182054
PCT Pub. Date: Dec. 12, 2013

(65) Prior Publication Data
US 2015/0142735 A1    May 21, 2015

(30) Foreign Application Priority Data
Jun. 6, 2012 (CN) .......................... 2012 1 0184642

(51) Int. Cl.
*G06F 17/30* (2006.01)
(52) U.S. Cl.
CPC .. *G06F 17/30424* (2013.01); *G06F 17/30566* (2013.01); *G06F 17/30575* (2013.01)

(58) Field of Classification Search
CPC ..................... G06F 17/30575; G06F 17/30424
See application file for complete search history.

(56) References Cited

U.S. PATENT DOCUMENTS 7,467,129 B1    12/2008 Bong
2006/0047903 A1*    3/2006 Passerini .............. G06F 3/0622
                                                              711/114
(Continued)

FOREIGN PATENT DOCUMENTS

CN        101989301 A    3/2011
CN        102103602 A    6/2011
(Continued)

OTHER PUBLICATIONS

Notification of the First Office Action of Japanese application No. 2015-514344, issued on Nov. 4, 2015.
(Continued)

*Primary Examiner* — Mohammad S Rostami
(74) *Attorney, Agent, or Firm* — Oppedahl Patent Law Firm LLC (57) ABSTRACT

Described is a memory searching system, including an indexing module and a searching module. The indexing module, provided with multiple indexed databases, acquires and records updated indexed data in an indexed database provided to the indexing module and synchronizes the searching module with the updated indexed data recorded in the indexed database provided to the indexing module. The searching module updates an indexed database in a memory with the updated indexed data received from the indexing module (the indexed database in the memory corresponds to the indexed database provided to the indexing module), and switches a pointer of the indexed database to the updated indexed database in the memory. Also described is a memory searching method, a real-time searching system and method, capable of better supporting real-time search and of (Continued)

updating indexed data in seconds in a realistic application, reducing the cost of hardware equipment and improving searching efficiency.

3 Claims, 3 Drawing Sheets

(56) References Cited

U.S. PATENT DOCUMENTS

| | | | | |
|---|---|---|---|---|
| 2006/0080303 | A1* | 4/2006 | Sargent | G06F 17/30613 |
| 2008/0016037 | A1* | 1/2008 | Enomoto | G01C 21/26 |
| 2010/0145933 | A1* | 6/2010 | Consul | G06F 17/30321 |
| | | | | 707/722 |
| 2010/0191884 | A1* | 7/2010 | Holenstein | G06F 11/2094 |
| | | | | 710/200 |
| 2011/0153586 | A1* | 6/2011 | Wang | G06F 17/30545 |
| | | | | 707/706 |
| 2011/0270820 | A1* | 11/2011 | Agarwal | G06F 17/273 |
| | | | | 707/709 |
| 2012/0130997 | A1 | 5/2012 | Risvik | |

FOREIGN PATENT DOCUMENTS

| | | |
|---|---|---|
| CN | 102402605 A | 4/2012 |
| JP | H07146880 A | 6/1995 |
| JP | H1185585 A | 3/1999 |
| JP | 2001185585 A | 7/2001 |
| JP | 2006134169 A | 5/2006 |
| JP | 2006185019 A | 7/2006 |
| JP | 2007146880 A | 6/2007 |

OTHER PUBLICATIONS

Understanding of The Changes of DB Technology, More In-Depth Understanding, And Thus The Structure and Use of the DB Technology Will Not Fail, mailed on Apr. 1, 2001.

International Search Report in international application No. PCT/CN2013/076788, mailed on Sep. 19, 2013.

English Translation of the Written Opinion of the International Search Authority in international application No. PCT/CN2013/076788, mailed on Sep. 19, 2013.

The Design and Realization of a Real-time Updating Index Dec. 31, 2005.

* cited by examiner

MEMORY SEARCHING SYSTEM AND METHOD, REAL-TIME SEARCHING SYSTEM AND METHOD, AND COMPUTER STORAGE MEDIUM

The present application claims the priority of CN application 201210184642.2, titled "MEMORY SEARCHING SYSTEM AND METHOD, AND REAL-TIME SEARCHING SYSTEM AND METHOD" filed on Jun. 6, 2012 by TENCENT Technology (Shenzhen) Company Ltd., the disclosure of which is incorporated by reference herein in its entirety.

TECHNICAL FIELD

The present disclosure relates to data processing technology, and in particular to a memory searching system and method, a real-time searching system and method, and a computer storage medium.

BACKGROUND

In an existing search system supporting real-time search, indexing and searching are merged into one process, a new reverse-order sorting index may be used immediately in search. After indexed data in the memory reach a threshold or a time interval reaches a threshold, the indexed data in the memory are merged into indexed data in a disk. Thus in search, both the indexed data in the memory and the indexed data in the disk have to be searched at the same time. Real-time performance of the search system can meet the requirement when a data set to be searched is small. However, as searching and indexing are integrated in one process, both searching and indexing will consume a lot of computational resources. Therefore, in a search system with massive data, adoption of such a searching architecture will consume a lot of hardware equipments, leading to high cost and low efficiency.

SUMMARY

In view of this, it is desired that embodiments of the present disclosure provide a memory searching system and method, a real-time searching system and method, and a computer storage medium, capable of not only implementing real-time fast memory searching, but also reducing cost and improving efficiency.

To this end, some technical solutions of embodiments of the present disclosure are implemented as follows.

An embodiment of the present disclosure provides a memory searching system, including an indexing module and a searching module, wherein the indexing module is provided with multiple indexed databases, and is configured for: acquiring updated indexed data and recording the updated indexed data in an indexed database provided to the indexing module; and synchronizing the searching module with the updated indexed data recorded in the indexed database provided to the indexing module; and the searching module is configured for: receiving the updated indexed data from the indexing module; updating an indexed database in a memory with the received indexed data, wherein the indexed database in the memory corresponds to the indexed database provided to the indexing module; and switching a pointer of the indexed database to the updated indexed database in the memory.

An embodiment of the present disclosure provides a real-time searching system, including a disk searching sub-system, a first memory searching sub-system, and a second memory searching sub-system, wherein the disk searching sub-system contains all indexed data, and is configured for conducting a search of all data;

the first memory searching sub-system contains indexed data recently updated within a first time threshold, and is configured for conducting a search of data recently updated within the first time threshold; and the second memory searching sub-system contains indexed data recently updated within a second time threshold, and is configured for conducting a search of data recently updated within the second time threshold, wherein the first time threshold and the second time threshold are preset, such that the second time threshold is less than the first time threshold.

An embodiment of the present disclosure provides a memory searching method, including steps of:

providing multiple indexed databases; acquiring updated indexed data and recording the updated indexed data in an indexed database provided; and performing synchronization with the updated indexed data recorded in the indexed database provided; and receiving the synchronized indexed data; updating an indexed database in a memory with the received indexed data, wherein the indexed database in the memory corresponds to the indexed database provided; and switching a pointer of the indexed database in the memory to the updated indexed database in the memory.

An embodiment of the present disclosure provides a real-time searching method, implemented by a real-time searching system including a disk searching sub-system, a first memory searching sub-system, and a second memory searching sub-system, wherein the disk searching sub-system contains all indexed data, and is configured for conducting a search of all data; the first memory searching sub-system contains indexed data recently updated within a first time threshold, and is configured for conducting a search of data recently updated within the first time threshold; and the second memory searching sub-system contains indexed data recently updated within a second time threshold, and is configured for conducting a search of data recently updated within the second time threshold, wherein the first time threshold and the second time threshold are preset, such that the second time threshold is less than the first time threshold;

the method includes: when a request for searching for all data is received, conducting a search of the all data by the disk searching sub-system; and/or when a request for searching for data recently updated within a period of time no greater than the first time threshold and greater than the second time threshold is received, conducting, by the first memory searching sub-system, a search of the data recently updated within the first time threshold; and/or when a request for searching data recently updated within a period of time no greater than the second time threshold is received, conducting, by the second memory searching sub-system, a search of the data recently updated within the second time threshold.

An embodiment of the present disclosure provides a non-transitory computer storage medium, storing a computer program for executing the memory searching method or real-time searching method.

With the memory searching system and method and the real-time searching system and method, and non-transitory computer storage medium according to embodiments of the present disclosure, an indexing module performs indexed data updating database by database; and searching module can also update indexed data in the memory database by database. Real-time search can be better supported by storing indexed data database by database, incrementally synchronized indexing and whole-memory search, allowing indexed data updating in seconds in a realistic application; the indexing module and the searching module are separated by architecture, reducing a cost of a hardware equipment and improving searching efficiency.

DETAILED DESCRIPTION

Embodiment 1

An embodiment of the present disclosure provides a memory searching system, including an indexing module and a searching module. The indexing module updates indexed data in an indexed database provided to the indexing module, and synchronizes the searching module with the updated indexed data recorded in the indexed database provided to the indexing module. The searching module updates in real time an indexed database in a memory (the indexed database in the memory corresponds to the indexed database provided to the indexing module); and switches a pointer of the indexed database in the memory to the updated indexed database in the memory, such that indexed data can be updated fast and timely.

An embodiment of the present disclosure provides a memory searching system including an indexing module and a searching module. The indexing module is provided with multiple indexed databases, and is configured for: acquiring indexed data and recording the indexed data in an indexed database provided to the indexing module; and synchronizing the searching module with the updated indexed data recorded in the indexed database provided to the indexing module. The searching module is configured for: receiving the updated indexed data from the indexing module; updating an indexed database in a memory with the received indexed data (the indexed database in the memory corresponds to the indexed database provided to the indexing module); and switching a pointer to the updated indexed database in the memory.

In an embodiment, the indexing module is configured for: acquiring the updated indexed data by processing original data currently received; recording the updated indexed data in a current indexed database provided to the indexing module; and synchronizing the searching module with indexed data in the current indexed database provided to the indexing module. In an embodiment, each indexed database provided to the indexing module is sorted according to an updating time of data saved. The indexing module may be further configured for: when the current indexed database provided to the indexing module is full, recording updated indexed data currently obtained in a next indexed database provided to the indexing module, and synchronizing the searching module with indexed data in the next indexed database provided to the indexing module; continuing to record updated indexed data, until a last indexed database provided to the indexing module is full; then emptying a first indexed database provided to the indexing module, and recording updated indexed data currently obtained in the first indexed database provided to the indexing module; and synchronizing the searching module with indexed data in the first indexed database provided to the indexing module.

In an embodiment, the indexing module includes a data receiving sub-module, an indexed data generating sub-module, and an indexed data synchronizing sub-module. The data receiving sub-module is configured for receiving original data and generating a source data file. The indexed data generating sub-module is configured for processing the source data file to obtain reverse-order sorting information, saving the reverse-order sorting information to a reverse-order sorted database of a current indexed database provided to the indexing module, and notifying the indexed data synchronizing sub-module. The indexed data synchronizing sub-module is configured for: when being notified by the indexed data generating sub-module, synchronizing the searching module with the reverse-order sorting information in the reverse-order sorted database of the current indexed database provided to the indexing module.

In an embodiment, each indexed database provided to the indexing module may include: a normal-order sorted database configured for recording normal-order sorting information; and a reverse-order sorted database configured for recording the reverse-order sorting information.

The indexed data generating sub-module may be configured for: performing normal-order sorting processing on the source data file to obtain the normal-order sorting information, and recording the normal-order sorting information to the normal-order sorted database of the current indexed database provided to the indexing module; and then performing reverse-order sorting processing on the normal-order sorting information to obtain the reverse-order sorting information, and recording the reverse-order sorting information to the reverse-order sorted database of the current indexed database provided to the indexing module.

In an embodiment, the indexed data generating sub-module is configured for: inquiring about an indexed database for saving reverse-order sorting information of the original data involving numerical value updating according to the ID of the original data, and updating a numerical value attribute table of the reverse-order sorted database in the indexed database; and/or performing normal-order sorting processing on the original data involving text deleting to generate a normal-order sorting file marked with a deleting command and containing a to-be-deleted ID and generate a document data attribute file, and recording generated files to the normal-order sorted database of the current indexed database; then adding the to-be-deleted ID to a deleting table of each reverse-order sorted database containing the to-be-deleted ID, and updating a reverse-order sorting time stamp of the reverse-order sorted database; and/or performing normal-order sorting processing on the original data involving text updating to generate a normal-order sorting file marked with a deleting command and containing a to-be-deleted ID and generate a document data attribute file, and recording generated files to the normal-order sorted database of the current indexed database; then adding the to-be-deleted ID to a deleting table of each reverse-order sorted database containing the to-be-deleted ID, and reading all normal-order sorting files, sorting all <document, word, location> triples to obtain a reverse-order sorted indexing file, a reverse-order sorted numerical value attribute table, a docID-pageID mapping table, and a deleting table, recording obtained files to the reverse-order sorted database of the current indexed database provided to the indexing module, and updating a reverse-order sorting time stamp of the reverse-order sorted database; and/or performing normal-order sorting processing on the original data involving text adding to generate a normal-order sorting file and a document data attribute file, and recording generated files to the normal-order sorted database of the current indexed database; then reading all normal-order sorting files, sorting all <document, word, location> triples to obtain a reverse-order sorted indexing file, a reverse-order sorted numerical value attribute table, a docID-pageID mapping table, and a deleting table, recording obtained files to the reverse-order sorted database of the current indexed database provided to the indexing module, and updating a reverse-order sorting time stamp of the reverse-order sorted database.

In an embodiment, the searching module is configured for: receiving the reverse-order sorting information from the indexed data synchronizing sub-module; loading the received reverse-order sorting information to a temporary database of the memory; and after synchronization with all reverse-order sorting information in the reverse-order sorted database of the current indexed database provided to the indexing module is completed, replacing an indexed database in the memory with the temporary database by switching a pointer of the indexed database in the memory to the temporary database, wherein the indexed database in the memory corresponds to the current indexed database provided to the indexing module.

Embodiment 2

Figure 1:
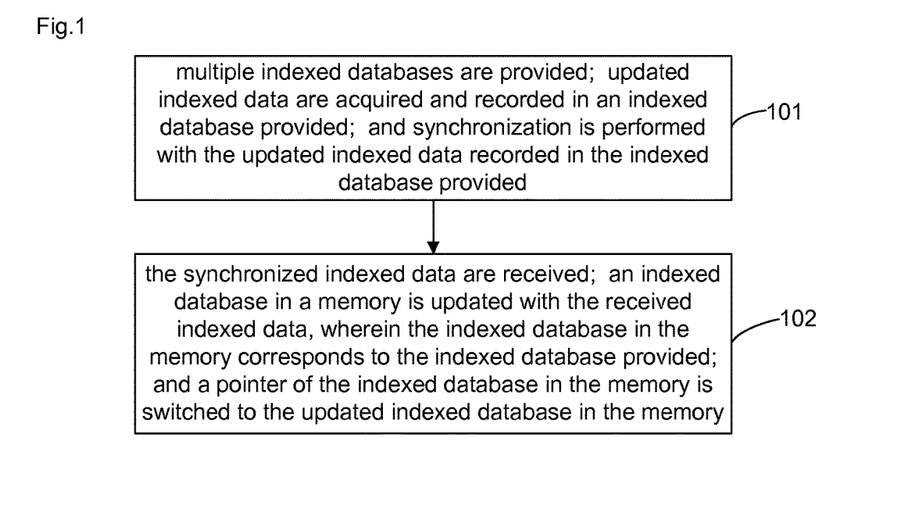
FIG. 1 is a flowchart of implementing a memory searching method according to Embodiment 2 of the present disclosure.

Accordingly, an embodiment of the present disclosure further provides a memory searching method. As shown in FIG. 1, the memory searching method includes steps as follows.

In step 101, multiple indexed databases are provided; updated indexed data are acquired and recorded in an indexed database provided; and synchronization is performed with the updated indexed data recorded in the indexed database provided.

Here, step 101 is implemented by the indexing module of the system according to Embodiment 1, and synchronization is performed on the searching module according to Embodiment 1.

In step 102, the synchronized indexed data are received; an indexed database in a memory is updated with the received indexed data, wherein the indexed database in the memory corresponds to the indexed database provided; and a pointer of the indexed database in the memory is switched to the updated indexed database in the memory.

Here, step 102 is implemented by the searching module of the system according to Embodiment 1.

Specifically, the step of acquiring updated indexed data and recording the updated indexed data in an indexed database provided to the indexing module; and synchronizing the searching module with the updated indexed data recorded in the indexed database provided to the indexing module may include: acquiring the updated indexed data by processing original data currently received; recording the updated indexed data in a current indexed database provided to the indexing module; and synchronizing the searching module with indexed data in the current indexed database provided to the indexing module.

Here, the step of acquiring updated indexed data and recording the updated indexed data in an indexed database provided to the indexing module; and synchronizing the searching module with the updated indexed data recorded in the indexed database provided to the indexing module may further include: sorting each indexed database according to an updating time of data saved; when the current indexed database provided to the indexing module is full, recording, by the indexing module, updated indexed data currently obtained in a next indexed database provided to the indexing module, and synchronizing the searching module with indexed data in the next indexed database provided to the indexing module; continuing to record updated indexed data, until a last indexed database provided to the indexing module is full; then emptying a first indexed database provided to the indexing module, and recording updated indexed data currently obtained in the first indexed database provided to the indexing module; and synchronizing the searching module with indexed data in the first indexed database provided to the indexing module.

Specifically, the step of acquiring updated indexed data and recording the updated indexed data in an indexed database provided to the indexing module; and synchronizing the searching module with the updated indexed data recorded in the indexed database provided to the indexing module may include: receiving the original data, generating the source data file; processing the source receiving original data and generating a source data file; processing the source data file to obtain reverse-order sorting information; saving the reverse-order sorting information to a reverse-order sorted database of a current indexed database provided to the indexing module; and synchronizing the searching module with the reverse-order sorting information in the reverse-order sorted database of the current indexed database provided to the indexing module.

Here, each indexed database may include: a normal-order sorted database configured for recording normal-order sorting information; and a reverse-order sorted database configured for recording the reverse-order sorting information. The step of processing the source data file to obtain reverse-order sorting information; saving the reverse-order sorting information to a reverse-order sorted database of a current indexed database provided to the indexing module may include: performing normal-order sorting processing on the source data file to obtain the normal-order sorting information, and recording the normal-order sorting information to the normal-order sorted database of the current indexed database; and then performing reverse-order sorting processing on the normal-order sorting information to obtain the reverse-order sorting information, and recording the reverse-order sorting information to the reverse-order sorted database of the current indexed database.

The step of receiving, by the searching module, the updated indexed data from the indexing module; updating an indexed database in a memory with the received indexed data, wherein the indexed database in the memory corresponds to the indexed database provided to the indexing module; and switching a pointer of the indexed database to the updated indexed database in the memory may include: receiving the reverse-order sorting information; loading the received reverse-order sorting information to a temporary database of the memory; and after synchronization with all reverse-order sorting information in the reverse-order sorted database of the current indexed database provided to the indexing module is completed, replacing an indexed database in the memory with the temporary database by switching a pointer of the indexed database in the memory to the temporary database, wherein the indexed database in the memory corresponds to the current indexed database provided to the indexing module.

Embodiment 3

Figure 2:
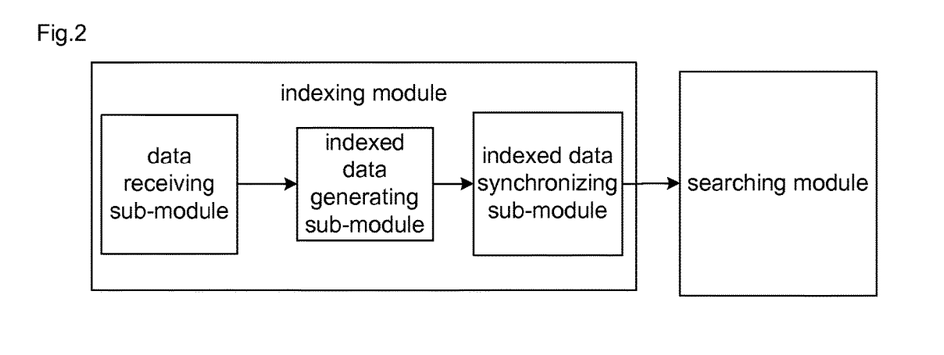
FIG. 2 is a schematic diagram of a structure of a memory searching system according to Embodiment 3 of the present disclosure.

As shown in FIG. 2, a memory searching system proposed by an embodiment of the present disclosure may include an indexing module and a searching module, wherein the indexing module and the searching module are provided respectively on two separate equipments, wherein the two separate equipments may be connected to each other via cable or communicate with each other wirelessly. The indexing module is configured for: processing original data received in real time to obtain reverse-order sorting information, recording the obtained reverse-order sorting information to the reverse-order sorted database of a current indexed database provided to the indexing module; and synchronizing the searching module with the reverse-order sorting information in the reverse-order sorted database. The searching module is configured for: receiving the reverse-order sorting information from the indexing module; updating an indexed database in a memory with the received reverse-order sorting information (the indexed database in the memory corresponds to the indexed database provided to the indexing module); and switching a pointer to the updated indexed database in the memory.

In an embodiment, the indexing module includes a data receiving sub-module, an indexed data generating sub-module, and an indexed data synchronizing sub-module. The data receiving sub-module is configured for receiving original data and generating a source data file. The indexed data generating sub-module is configured for processing the source data file to obtain reverse-order sorting information, saving the reverse-order sorting information to a reverse-order sorted database of a current indexed database provided to the indexing module, and notifying the indexed data synchronizing sub-module. The indexed data synchronizing sub-module is configured for: when being notified by the indexed data generating sub-module, synchronizing the searching module with the reverse-order sorting information in the reverse-order sorted database of the current indexed database provided to the indexing module.

In an embodiment, the original data received by the data receiving sub-module may contain data content and a data operation command. There are mainly four types of data operation commands, namely, text adding, text updating, text deleting and numerical value updating. The original data with the text adding command may be a document in a fixed xml format including a text field and a numerical value field. The text field may be configured for recording text information of the document, such as a caption and a body of text. The numerical value field may be configured for recording a numerical value attribute of the document, for example identification information of the document such as an ID, fingerprint or the like. The original data with the numerical value updating command contain only the ID of a document to be updated and a corresponding numerical value attribute. The original data with the text deleting command contain an ID of a document to be deleted. Here, in source data file generation, original data with the text adding, text updating, or text deleting command are all written in one file, while the original data with the numerical value updating command is stored in another separate file.

Multiple indexed databases are provided to the indexed data generating sub-module. Each indexed database may have an identical capacity threshold, which denotes a maximal indexed data of the original data an indexed database can store. Each indexed database is sorted according to an updating time of indexed data saved. The first indexed database has the earliest updating time, and the last indexed database has the latest updating time. Accordingly, multiple indexed databases are provided in the memory. Each indexed database in the memory corresponds respectively to an indexed database provided to the indexed data generating sub-module.

Figure 3:
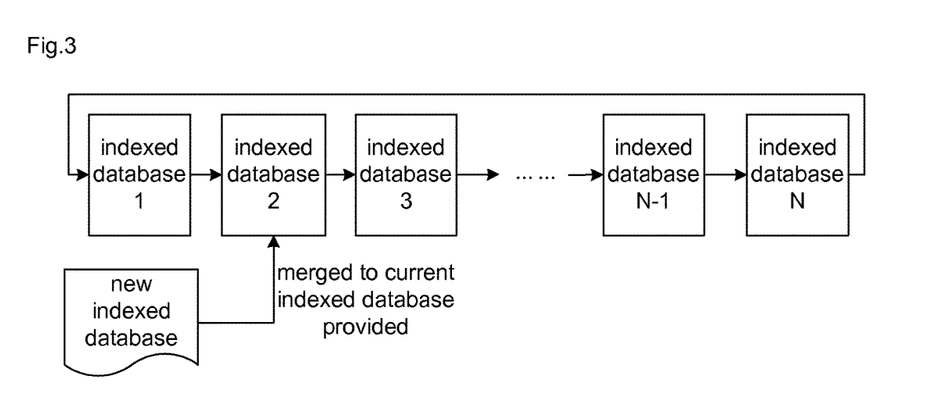
FIG. 3 is a schematic diagram of a structure of an example of arrangement of multiple indexed databases in an indexing module according to Embodiment 3 of the present disclosure.

For example, as shown in FIG. 3, N indexed databases (N being an integer greater than 1), namely, indexed database 1, indexed database 2, indexed database 3, . . . , indexed database N−1, indexed database N, may be provided in the indexed data generating sub-module. The indexed databases are sorted according to a data updating time (for example, a time stamp of updating a reverse-order sorted database of the indexed database), indexed database 1 has the earliest updating time, indexed database N has the latest updating time. If indexed database 2 is currently in use, then the indexed data generating sub-module saves indexed data currently obtained together to indexed database 2; that is to say, the indexed data generating sub-module saves normal-order sorting information and reverse-order sorting information currently obtained together to indexed database 2.

Each indexed database includes a normal-order sorted database and a reverse-order sorted database. The normal-order sorted database is configured for recording normal-order sorting information of all original data in the indexed database. Such normal-order sorting information may include a normal-order sorting file, a document data attribute file, or the like. The normal-order sorting file is configured for recording all triples <document, word, location>. The document attribute file is configured for recording a numerical value attribute of various original data. The reverse-order sorted database is configured for recording reverse-order sorting information of all original data in the indexed database. Such reverse-order sorting information may include a reverse-order sorted indexing file, a reverse-order sorted numerical value attribute table, a docID-pageID mapping table, a deleting table, or the like.

The indexed data generating sub-module scans in real time a source data file obtained by a data receiving sub-module, performs normal-order sorting processing and reverse-order sorting processing on the original data currently updated, and saves obtained normal-order sorting information and reverse-order sorting information to the current indexed database provided to the indexed data generating sub-module. In an embodiment, the indexed data generating sub-module performs normal-order sorting processing on the original data currently updated to obtain normal-order sorting information such as the normal-order sorting file and the document data attribute file, and records the normal-order sorting information to the normal-order sorted database of the current indexed database; and then acquires, according to the normal-order sorting information such as the normal-order sorting file and the document data attribute file, reverse-order sorting information such as a reverse-order sorted indexing file, a reverse-order sorted numerical value attribute table, a docID-pageID mapping table, and a deleting table, and records the reverse-order sorting information to the reverse-order sorted database of the current indexed database.

If the amount of data in a current indexed database provided to the indexed data generating sub-module reach a preset capacity threshold, then normal-order sorting information and reverse-order sorting information currently obtained is saved in an indexed database provided next to the current indexed database provided. If currently the amount of data in each indexed database reach a preset capacity threshold, then the first indexed database is emptied, and normal-order sorting information and reverse-order sorting information currently obtained is saved to the first indexed database. That is to say, currently obtained normal-order sorting information is recorded in the normal-order sorted database of the first indexed database, and currently obtained reverse-order sorting information is recorded in the reverse-order sorted database of the first indexed database. The indexed data generating sub-module saves obtained indexed data in each indexed database chronologically. For the example as shown in FIG. 3, when indexed database 1 is full, indexed data are stored in indexed database 2, when indexed database 2 is full, indexed data are stored in indexed database 3, and so on, until indexed database N is full, then indexed database 1 is emptied, and indexed data are stored in indexed database 1. Thus, indexed data may be stored cyclically in each indexed database, that is to say, normal-order sorting information and reverse-order sorting information may be stored cyclically in each indexed database.

In an embodiment, for various original data, the indexed data generating sub-module performs normal-order sorting processing and reverse-order sorting processing as follows.

First, for original data involving numerical value updating, an indexed database for saving reverse-order sorting information of the original data involving numerical value updating is inquired about according to the ID of the original data, and a numerical value attribute table of the reverse-order sorted database in the indexed database is updated. In an embodiment, a numerical value in the numerical value attribute table of the reverse-order sorted database in the indexed database is updated with a corresponding numerical value in the original data, and a time stamp of the numerical value attribute table is updated.

Second, for original data involving text deleting, normal-order sorting processing is performed on the original data involving text deleting to obtain normal-order sorting information; that is to say, a normal-order sorting file marked with a deleting command and containing a to-be-deleted ID, as well as a document data attribute file, is generated, and generated files are recorded to the normal-order sorted database of the current indexed database provided; then, reverse-order sorting processing is performed, i.e. the to-be-deleted ID is added to a deleting table of each reverse-order sorted database containing the to-be-deleted ID, and a reverse-order sorting time stamp of the reverse-order sorted database containing the to-be-deleted ID is updated Thirdly, for original data involving text updating, normal-order sorting processing is performed on the original data involving text updating to generate normal-order sorting information; that is to say, a normal-order sorting file marked with a deleting command and containing a to-be-deleted ID, as well as a document data attribute file, is generated, and generated files are recorded to the normal-order sorted database of the current indexed database provided; then, reverse-order sorting processing is performed, i.e. the to-be-deleted ID is added to a deleting table of each reverse-order sorted database containing the to-be-deleted ID, and all normal-order sorting files are read, all <document, word, location> triples are sorted to obtain reverse-order sorting information such as a reverse-order sorted indexing file, a reverse-order sorted numerical value attribute table, a docID-pageID mapping table, and a deleting table; obtained reverse-order sorting information is recorded to the reverse-order sorted database of the current indexed database, and a reverse-order sorting time stamp of the reverse-order sorted database is updated.

Fourthly, for original data involving text adding, normal-order sorting processing is performed on the original data involving text adding to generate normal-order sorting information; that is to say, a normal-order sorting file and a document data attribute file are generated, and generated files are recorded to the normal-order sorted database of the current indexed database provided; then reverse-order sorting processing is performed, i.e. all normal-order sorting files are read, and all <document, word, location> triples are sorted to obtain reverse-order sorting information such as a reverse-order sorted indexing file, a reverse-order sorted numerical value attribute table, a docID-pageID mapping table, and a deleting table; obtained reverse-order sorting information is recorded to the reverse-order sorted database of the current indexed database; and a reverse-order sorting time stamp of the reverse-order sorted database is updated.

Note that during the aforementioned processing by the indexed data generating sub-module, the indexed data generating sub-module first performs the normal-order sorting processing on a specified amount of original data to obtain normal-order sorting information thereof, and records the normal-order sorting information to the normal-order sorted database of the current indexed database provided to the indexed data generating sub-module; and then reads all reverse-order sorting information obtained, and performs the reverse-order sorting processing on all reverse-order sorting information to obtain reverse-order sorting information thereof, and records the reverse-order sorting information to the reverse-order sorted database of the current indexed database provided to the indexed data generating sub-module. A new the reverse-order sorted database is obtained after the aforementioned operation. Here, the amount of original data processed in one time by the indexed data generating sub-module is no greater than the capacity threshold of an indexed database, and may be a fraction of the capacity threshold of the indexed database, or equal to the capacity threshold of the indexed database.

After a new reverse-order sorted database is generated or a reverse-order sorted database is updated, the indexed data generating sub-module notifies the indexed data synchronizing sub-module to perform data synchronization. The indexed data synchronizing sub-module synchronizes the searching module with reverse-order sorting information in the reverse-order sorted database of the current indexed database provided to the indexed data generating sub-module. Here, an indexed database other than the indexed database currently in use remains unchanged, and synchronization can be performed without such an unchanged indexed database. Thus, impact of data synchronization on performance of a searching system can be reduced.

After receiving the reverse-order sorting information from the indexed data synchronizing sub-module, the searching module loads the received reverse-order sorting information to a temporary database of the memory; and after synchronization with all reverse-order sorting information contained in the reverse-order sorted database of the current indexed database provided to the indexed data generating sub-module is completed, the searching module replaces an indexed database in the memory with the temporary database by switching a pointer of the indexed database in the memory to the temporary database, wherein the indexed database in the memory corresponds to the current indexed database provided to the indexed data generating sub-module.

Figure 4:
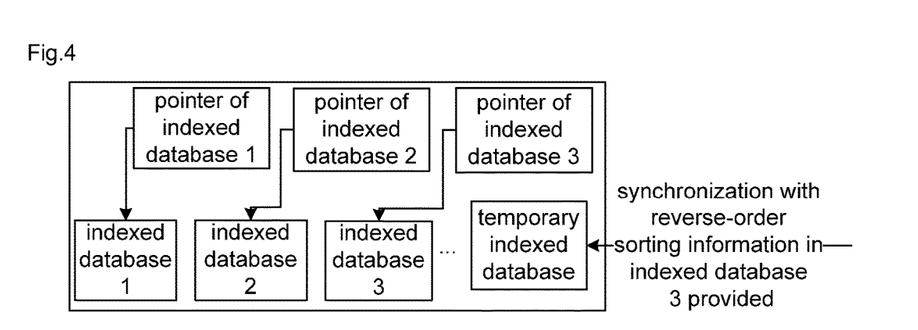
FIG. 4 is a schematic diagram of an example of updating, by the searching module, indexed data in the memory according to Embodiment 3 of the present disclosure.
Figure 5:
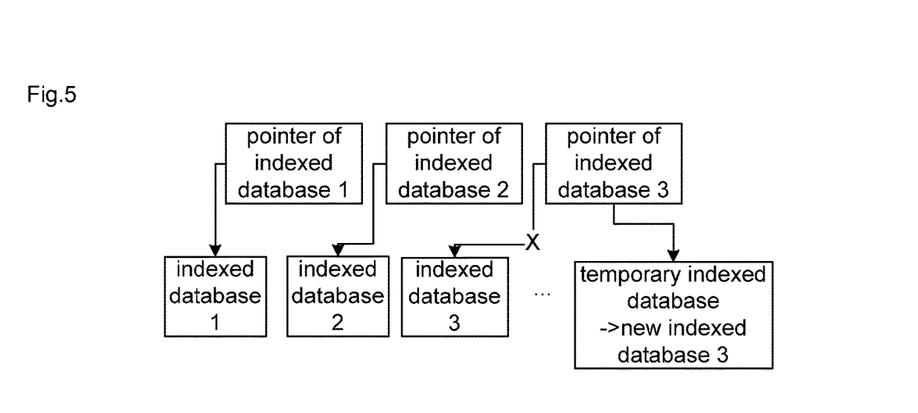
FIG. 5 is a schematic diagram of an example of updating, by the searching module, indexed data in the memory according to Embodiment 3 of the present disclosure.

For example, as shown in FIG. 4 and FIG. 5, indexed database 3 is currently in use, then the indexed data synchronizing sub-module synchronizes the searching module with reverse-order sorting information in the reverse-order sorted database of indexed database 3 provided to the indexed data generating sub-module. After receiving the reverse-order sorting information, the searching module loads the reverse-order sorting information to a temporary database of the memory. After the temporary database is synchronized with all reverse-order sorting information in the reverse-order sorted database of indexed database 3, the searching module sets the temporary database as the new indexed database 3 of the memory, and deletes the old indexed database 3 in the memory, and switches the pointer of indexed database 3 to the new indexed database 3. Thus, it can be ensured that the searching module provides the outside a searching service based on indexed data updated in real time. Meanwhile, as a database switching operation is implemented by switching a pointer in the memory, smooth switching is allowed, basically without impacting a searching service provided by the searching module to the outside.

To sum up, after entering the indexing module, a document has to go through normal-order sorting, reverse-order sorting, and data synchronization. As the processing is always performed on added part of data, time spent in normal-order sorting is small, and data synchronization, which mainly involves network transmission, will not become a performance bottleneck either. Reverse-order sorting processing is always performed on all normal-order sorting information in an indexed database, and is usually time-consuming. However, as the capacity of a single indexed database is limited during said process, reverse-order sorting time will be lowered, thereby accelerating indexed data updating.

In the embodiment, indexed data updating may be accelerated greatly by recording in a manner of database-by-database, incremental synchronization, and whole-memory search, etc.

Embodiment 4

In a realistic usage, multiple searching systems may be combined to implement real-time search.

Figure 6:
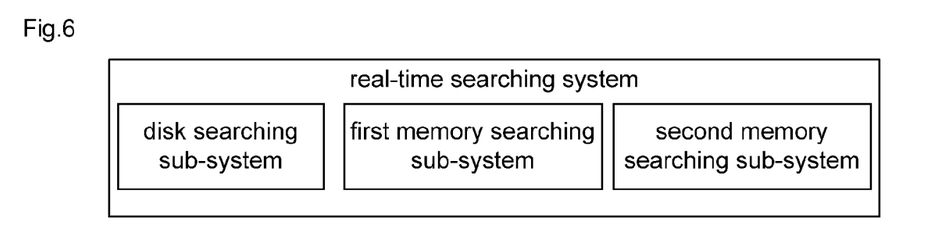
FIG. 6 is a schematic diagram of a structure of a real-time searching system according to Embodiment 4 of the present disclosure.

The embodiment provides a real-time searching system. As shown in FIG. 6, the system includes a disk searching sub-system, a first memory searching sub-system, and a second memory searching sub-system.

The disk searching sub-system contains all indexed data, and is configured for conducting a search of all data.

The first memory searching sub-system contains indexed data recently updated within a first time threshold, and is configured for conducting a search of data recently updated within the first time threshold.

The second memory searching sub-system contains indexed data recently updated within a second time threshold, and is configured for conducting a search of data recently updated within the second time threshold.

The first time threshold and the second time threshold are preset, and the second time threshold is less than the first time threshold.

Here, the first memory searching sub-system may include a first indexing module and a first searching module. The first indexing module is provided with multiple indexed databases, and is configured for: acquiring indexed data recently updated within the first time threshold, and recording the acquired indexed data in an indexed database provided to the first indexing module; and synchronizing the first searching module with the acquired indexed data recorded in the indexed database provided to the first indexing module. The first searching module is configured for: receiving the indexed data from the first indexing module; updating an indexed database in a memory with the received indexed data, wherein the indexed database in the memory corresponds to the indexed database provided to the first indexing module; switching a pointer of the indexed database in the memory to the updated indexed database in the memory; and conducting a search of the data recently updated within the first time threshold.

Here, the second memory searching sub-system may include a second indexing module and a second searching module. The second indexing module is provided with multiple indexed databases, and is configured for: acquiring indexed data recently updated within the second time threshold, and recording the acquired indexed data in an indexed database provided to the second indexing module; and synchronizing the second searching module with the acquired indexed data recorded in the indexed database provided to the second indexing module. The second searching module is configured for: receiving the indexed data from the second indexing module; updating an indexed database in a memory with the received indexed data, wherein the indexed database in the memory corresponds to the indexed database provided to the second indexing module; switching a pointer of the indexed database in the memory to the updated indexed database in the memory; and conducting a search of the data recently updated within the second time threshold.

That is to say, the structure of both the first memory searching sub-system and the second memory searching sub-system in the embodiment are same as that of the memory searching system according to Embodiment 1, the only difference is that the first memory searching sub-system updates indexed data within the first time threshold, and the second memory searching sub-system updates indexed data within the second time threshold.

Accordingly, the embodiment further provides a real-time searching method implemented by the aforementioned real-time searching system. The method may include that: when a request for searching for all data is received, the disk searching sub-system conducts a search of the all data; and/or when a request for searching for data recently updated within a period of time no greater than the first time threshold and greater than the second time threshold is received, the first memory searching sub-system conducts a search of the data recently updated within the first time threshold; and/or when a request for searching for data recently updated within a period of time no greater than the second time threshold is received, the second memory searching sub-system conducts a search of the data recently updated within the second time threshold.

Here, the first time threshold may be 2 days, and the second time threshold may be less than 2 days and no less than ten minutes. Generally speaking, the second time threshold may be set to be 10 minutes.

Specifically, the disk searching sub-system is the same as an existing disk searching system in structure, saves indexed data of all data, updates indexed data once each day, and can conduct a search of all data updated before the recent day, but cannot cover data updated within the recent day. The first memory searching sub-system may conduct a search of data updated within the recent 2 days; however as the amount of data updated within 2 days are large, indexing updating may not be able to meet a real-time requirement. The second memory searching sub-system may conduct a search of data recently updated within ten minutes, and indexed data are updated every 10 minutes; as the amount of data updated within 10 minutes are small, indexed data updating is closer to real-time updating, thereby implementing real-time data searching. By combining the aforementioned 3 sub-systems as one searching system, real-time search may be implemented, and recall of all searched data is guaranteed.

When implemented in form of a software functional module and sold or used as an independent product, a module of an embodiment of the present disclosure may also be stored in a non-transitory computer-readable storage medium. Based on such an understanding, the essential part or a part of the technical solution of an embodiment of the present disclosure contributing to prior art may appear in form of a software product, which software product is stored in storage media, and includes a number of instructions for allowing a computer equipment (such as a personal computer, a server, a network equipment, or the like) to execute all or part of the methods in various embodiments of the present disclosure. The storage media include various media that can store program codes, such as a U disk, a mobile hard disk, a Read-Only Memory (ROM), a Random Access Memory (RAM), a magnetic disk, a CD, and the like. Thus, an embodiment of the present disclosure is not limited to any specific combination of hardware and software.

Accordingly, an embodiment of the present disclosure further provides a non-transitory computer storage medium storing a computer program for executing a memory searching method or real-time searching method according to an embodiment of the present disclosure.

What described are merely embodiments of the present disclosure and are not intended to limit the scope of the present disclosure.

The invention claimed is:

1. A real-time searching system, comprising at least one processor, comprising a disk searching sub-system, a first memory searching sub-system, and a second memory searching sub-system,
    wherein the disk searching sub-system contains all indexed data, and is configured to conduct a search of all data,
    wherein the first memory searching sub-system contains indexed data recently updated within a first time threshold, and is configured to conduct a search of data recently updated within the first time threshold, and
    wherein the second memory searching sub-system contains indexed data recently updated within a second time threshold, and is configured to conduct a search of data recently updated within the second time threshold,
    wherein the first time threshold and the second time threshold are preset, and the second time threshold is less than the first time threshold,
    wherein the first memory searching sub-system comprises a first indexing module and a first searching module,
    wherein the first indexing module is provided with multiple indexed databases, and is configured to: acquire indexed data recently updated within the first time threshold, and record the acquired indexed data in an indexed database provided to the first indexing module; and synchronize the first searching module with the acquired indexed data recorded in the indexed database provided to the first indexing module, and
    wherein the first searching module is configured to: receive the indexed data from the first indexing module; update an indexed database in a memory with the received indexed data, wherein the indexed database in the memory corresponds to the indexed database provided to the first indexing module; switch a pointer of the indexed database in the memory to the updated indexed database in the memory; and conduct a search of the data recently updated within the first time threshold;
    wherein the second memory searching sub-system comprises a second indexing module and a second searching module,
    wherein the second indexing module is provided with multiple indexed databases and is configured to: acquire indexed data recently updated within the second time threshold, and record the acquired indexed data in an indexed database provided to the second indexing module; and synchronize the second searching module with the acquired indexed data recorded in the indexed database provided to the second indexing module, and
    wherein the second searching module is configured to: receive the indexed data from the second indexing module; update an indexed database in a memory with the received indexed data, wherein the indexed database in the memory corresponds to the indexed database provided to the second indexing module; switch a pointer of the indexed database in the memory to the updated indexed database in the memory: and conduct a search of the data recently updated within the second time threshold;
    each of the first indexing module, the first searching module, the second indexing module, and the second searching module comprising a computer processor and respective memory, the respective memory storing computer-readable instructions which when executed by the computer processor implement the functions of the said modules.

2. The real-time searching system according to claim 1, wherein the first time threshold is 2 days.

3. The real-time searching system according to claim 1, wherein the second time threshold is no less than ten minutes and is less than 2 days.

* * * * *